(12) United States Patent
Chinn et al.

(10) Patent No.: US 7,408,673 B1
(45) Date of Patent: Aug. 5, 2008

(54) MIXED COLOR GROUPS

(75) Inventors: Kathryn Chinn, Seattle, WA (US);
William Eisley, Seattle, WA (US);
Susan Cheng-Looi, Issaquah, WA (US)

(73) Assignee: Adobe Systems Incorporated, San Jose, CA (US)

( * ) Notice: Subject to any disclaimer, the term of this patent is extended or adjusted under 35 U.S.C. 154(b) by 987 days.

(21) Appl. No.: 10/646,993

(22) Filed: Aug. 21, 2003

(51) Int. Cl.
*H04N 1/60* (2006.01)
*G09G 5/02* (2006.01)
*G06K 9/00* (2006.01)

(52) U.S. Cl. .................. 358/1.9; 358/518; 345/593; 345/594; 382/162; 382/167

(58) Field of Classification Search ............... 358/1.9, 358/504, 518–525, 527; 101/483; 345/592, 345/593, 594; 382/162, 167
See application file for complete search history.

(56) References Cited

U.S. PATENT DOCUMENTS

| | | | |
|---|---|---|---|
| 6,262,810 B1 * | 7/2001 | Bloomer | 358/1.9 |
| 2002/0057833 A1 * | 5/2002 | Gill et al. | 382/162 |
| 2003/0234943 A1 * | 12/2003 | Van Bael | 358/1.9 |
| 2004/0113919 A1 * | 6/2004 | Hawksworth | 345/592 |
| 2004/0118310 A1 * | 6/2004 | Hawksworth | 101/483 |

OTHER PUBLICATIONS

Quark Technology Partnership, "A Guide to QuarkXpress: Interface Overview", 2002, QuarkXpress Passport and Quak Publishing Systems, pp. 190-197.
Adobe® InDesign® 2.0 User Guide for Windows and Macintosh, 2001, Adobe Systems Incorporated, San Jose, CA, pp. 22-26, 307, 309-330.

* cited by examiner

*Primary Examiner*—David K Moore
*Assistant Examiner*—Charlotte M Baker
(74) *Attorney, Agent, or Firm*—Fish & Richardson P.C.

(57) ABSTRACT

Methods and apparatus, including computer program products, implemented for creating and manipulating groups of color swatches that represent the results obtained by mixing multiple inks, such as multiple spot inks or spot inks and process inks. A mixed color group is defined based on data representing two or more colors, representing inks, and color parameters for each of the colors. The mixed color group includes mixed color swatches that each represent a mixture of amounts of two or more colors. The amounts of colors for each of the mixed color swatches are defined according to a function of the color parameters of the colors. The invention allows a user to create and modify swatches representing a spectrum of mixed colors from a combination of spot colors and/or process colors.

75 Claims, 4 Drawing Sheets

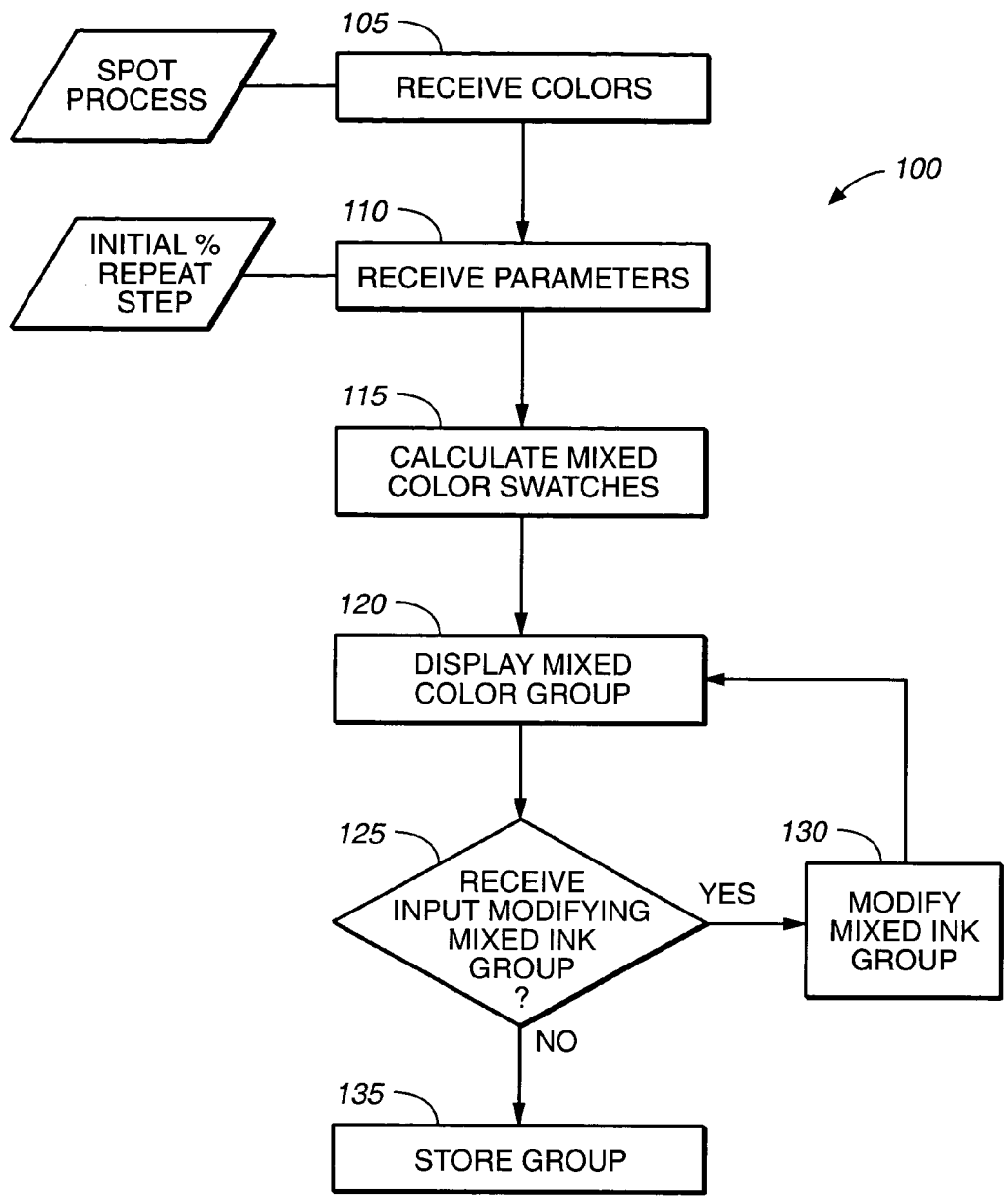
FIG._1

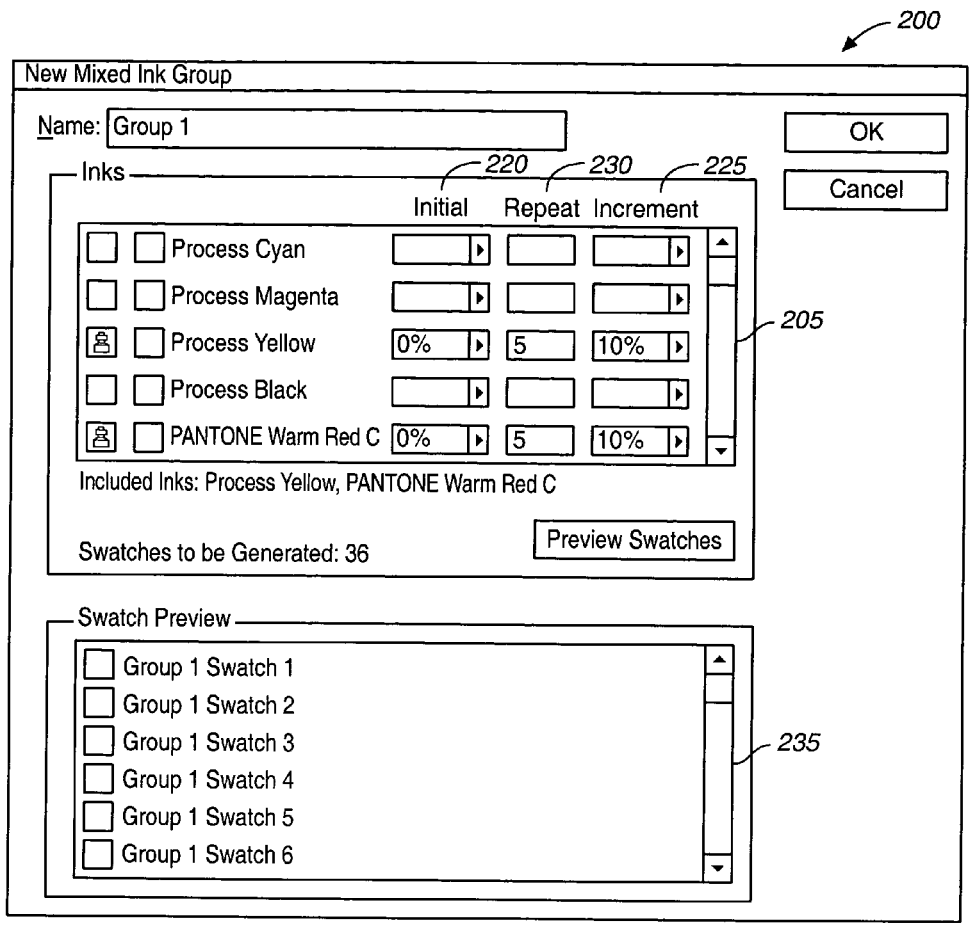
FIG._2
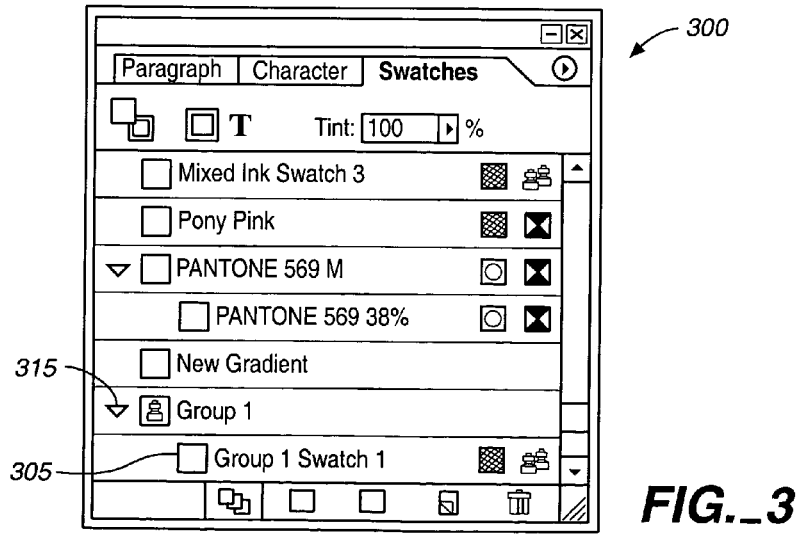
FIG._3

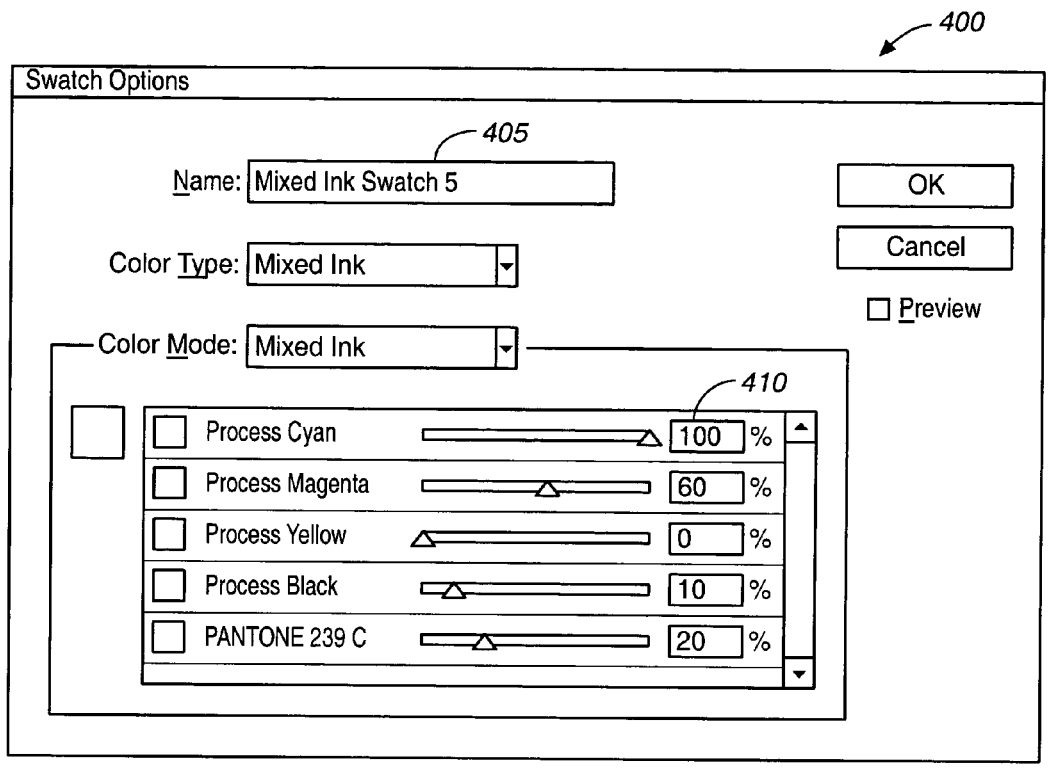
FIG._4
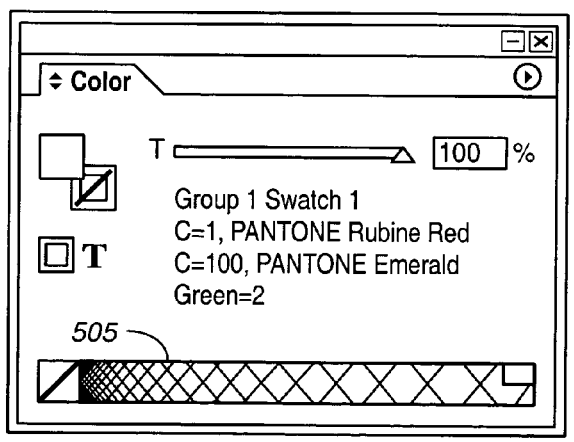
FIG._5

MIXED COLOR GROUPS

BACKGROUND

This invention relates to representing inks in electronic document systems. Computer programs such as page layout programs, graphical illustration programs and image processing programs provide users with the ability to create, edit and display electronic documents that can include color. Typically, such programs also provide users with the ability to print their documents, and many programs attempt to represent documents on the computer monitor in colors that bear some relation to the colors that will be output by a printer.

Printers typically use inks to print documents, which can be differentiated by the appearance or color one perceives when viewing the ink. Traditional printing systems can use inks of two types, process inks and spot inks. Process inks, which typically include the colors cyan, magenta, yellow and black (also referred to as C, M, Y and K, respectively), are used in so-called process printing to produce full-color photographs and designs. When combinations of these inks are printed as a series of halftone dot patterns, they can create the appearance of a wide variety of colors.

Spot inks, on the other hand, are inks other than the process inks, such as specially mixed inks, that are applied individually to the printed page. Spot inks are typically used to match a particular color in a document, or when only a small number of colors will be printed on the page. Typically, spot inks are specified by spot color printing systems, such as the PANTONE®, DIC, TOYO or ANPA systems. If a specific color is desired in a printed document, a spot ink can often provide the desired color more accurately than a mixture of process inks. However, spot inks tend to be more expensive than process inks, so that using more than a few spot inks in a printing process increases the cost. Accordingly, using process inks to achieve a range of desired colors is typically more economical for printing a broad spectrum of colors.

SUMMARY

The invention provides computer-implemented techniques for representing groups of color swatches that can be obtained by mixing multiple inks, such as multiple spot inks or spot inks and process inks. The invention allows a user to create and modify swatches representing a spectrum of mixed colors from a combination of spot colors and/or process colors.

In general, in one aspect, the invention features methods and computer program products for creating a mixed color group including mixed color swatches. Data that represent colors and data that represent color parameters for each of the colors are received. The colors each represent inks. A mixed color group is defined. The mixed color group includes mixed color swatches representing mixtures of amounts of the colors. The amounts of color for each mixed color swatch are defined according to a function of the color parameters of the colors.

Particular implementations can include one or more of the following features. The mixed color group and the mixed color swatches can be displayed. The inks that are represented by the colors can be spot inks or process inks. The color parameters can include an initial amount, an increment value and a repeat value. The parameters can be used to define the mixed color group. Two, three or more colors can be used to define the mixed color group. The swatches can be used to define a new mixed color group. The mixed color group can be changed, such as by changing the parameters or colors. If one of the colors used to define the swatches in the mixed color group represents a spot ink, the mixed group can be modified by determining the percentage of colors representing process inks that are required to produce mixed color swatches having the same appearance as the mixed color swatches defined by a color representing a spot ink. Tints can be defined for the mixed color swatches and the tints can be included in the mixed color group. The mixed color swatches can then be associated with locations in a document.

The invention can be implemented to provide one or more of the following advantages. By printing two or more inks in a halftone dot pattern, a printer can create the appearance of a color without using a separate ink for each desired color. The halftone dot pattern can include dots of different sizes and proximity to create different colors. A computer program can direct the printer to create a color by selecting a percentage of each ink to apply to the print media. Thus, the ink percentage controls the size of the dot, or the percentage of pixels which comprise a halftone dot that are printed with ink. The color created by the two or more printed inks can be represented by a computer program as a mixed color and multiple mixed colors may be represented by the computer program in a mixed color group.

Automatically defining a mixed color group makes it possible to represent a spectrum of mixed colors that can be created by mixing spot colors and/or process colors (where at least two colors are mixed), without requiring the user to individually create each mixed color. The mixed color group can contain swatches (i.e., individual color definitions) that can be used to manage colors in a document. For example, changing a mixed color swatch used in an electronic document causes each instance of the mixed color in the document to change. Mixed color groups can be defined based on any color from spot inks represented in commercially available color libraries, such as, Pantone®, DIC color, or TOYO. Associating each mixed color swatch with the mixed color group to which the mixed color swatch belongs simplifies the process of creating, editing and managing the mixed color swatches. Mixed color swatches can be edited as members of their respective mixed color group. A mixed color swatch can also be selected individually once created, and can be edited while remaining a member of the mixed color group. A maximum number of printed colors can be created at the lowest cost since the smallest number of inks can be used. A change in a printing color or parameter value automatically causes a global change to all the mixed color swatches in the mixed color group. The mixed color group can be associated with an electronic document.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a flow diagram of a method of creating and modifying a group of mixed color swatches.

FIG. 2 shows the inputs for creating the group of mixed color swatches.

FIG. 3 shows a graphic user interface of one embodiment of displaying mixed color swatches and mixed color groups.

FIG. 4 illustrates one example of creating a new mixed color swatch.

FIG. 5 shows a tint slider of one of the mixed color swatches.

DETAILED DESCRIPTION

Figure 6:
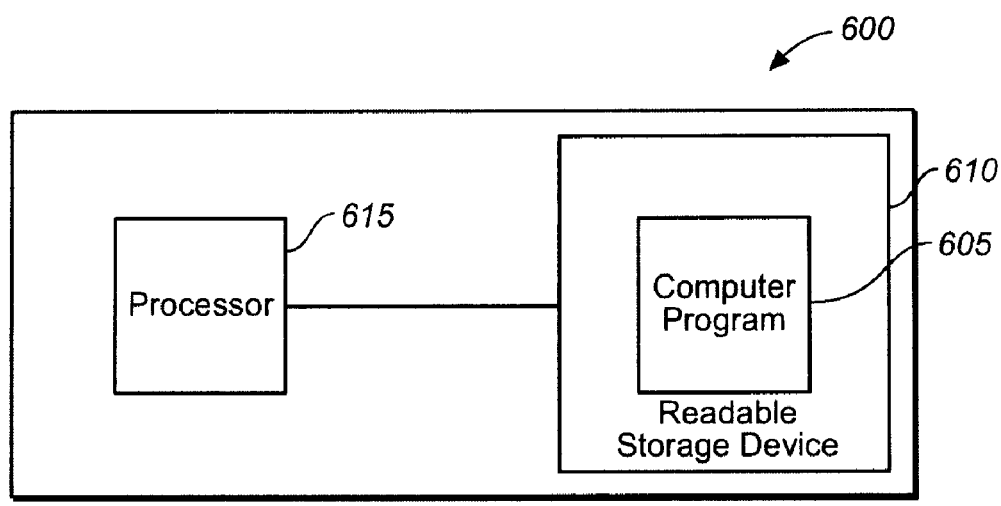
FIG. 6 shows an example computer readable medium.

The invention provides techniques for defining and managing color swatches that can be used in computer graphics, page layout, and other computer program applications. As used in this specification, the term "mixed color group" refers to a group of mixed color swatches. A mixed color swatch is an object that represents a color derived from two or more printing colors, which, in turn, are colors that represent spot inks and process inks that can be used in printing. The mixed color group is itself a container object that aggregates a collection mixed color swatches. Referring to FIG. 1, a method 100 of creating a mixed color group begins with the selection of at least two printing colors to be used to create a mixed color group in an electronic document program, such as a page layout program, an illustration program or an image processing program (step 105). The two or more printing colors can be either spot colors or process colors. Each spot color represents a spot ink, and is specifically defined for a particular document or for the electronic document program. Each spot color can represent a spot ink defined in a commercially available color system or color library, such as the PANTONE®, DIC color, or TOYO color libraries. Process colors represent process inks, such as cyan, magenta, yellow and black inks used in conventional CMYK printing systems, or the cyan, magenta, yellow, orange, green and black inks used in the PANTONE® Hexachrome® printing system. In some embodiments, the process colors are expressly represented by the program in the CMYK (or Hexachrome) color space. Alternatively, the electronic document program can be configured to represent the process colors in another selected (e.g., by a user) color space, such as, RGB, or CIE L*A*B color spaces, and to automatically translate colors from the representation color space into the process color space for printing. Any number of colors can be input to create the mixed color group; however the selected colors are typically limited to the actual inks that will be used to print the document.

Colors can be selected by a user using conventional graphical selection techniques, and the selection can be received as input by the electronic document program. The colors can be selected from a collection of available colors stored in memory; alternatively, the electronic document program can be configured to allow users to explicitly define colors, for example, the user can specify exactly what percentage of each ink to use to make a desired color. One implementation of a suitable graphical user interface 200 for receiving the selection is illustrated in FIG. 2. As shown in FIG. 2, the interface dialog 200 includes a printing color pane 205 in which the user can define and select colors that will be used to create the mixed color group. In the example shown, printing color pane 205 includes representations of the four process colors cyan, magenta, yellow and black, and a representation of a single spot color, identified as PANTONE Warm Red C. In the example shown, the user has selected process yellow and PANTONE Warm Red C as printing colors to be used to create a mixed color group, as indicated by the marked selection boxes to the left of the entries for those colors in printing color pane 205.

In addition to the printing colors, method 100 receives a set of parameters for the creation of the mixed color group (step 110). In one implementation, as illustrated in FIG. 2, the parameters include for each ink an initial value 220, representing the smallest percentage of each printing color that will be used to define each color swatch of the mixed color group, an increment value 225, representing an incremental percentage of the corresponding printing color that will be added to define each subsequent color swatch in the mixed color group, and a repeat value 230, representing the number of times the incremental percentage will be added to create different color swatches in the mixed color group. Alternatively, the color parameters can include an initial amount, a final amount, and a number of distinct values for each painting color, and the method can define the color swatches in the mixed color group by applying a uniform increment between the initial amount and final amount to generate mixed color swatches incorporating the number of distinct values of the painting color, such that each increment is the same for all mixed ink color swatches generated from the painting color. In other implementations, other parameters can be used instead of, or in addition to, these parameters.

The parameter values can be specified by the user using conventional input techniques, such as by typing in a value, adjusting a color slider, selecting from multiple preset value options. In the implementation illustrated in FIG. 2, the initial value 220 and increment value 225 are expressed as percentages of the corresponding printing color, ranging from 0% to 100%, while the repeat value 230 is expressed as an integer between 0 and 100. For any one mixed color swatch, the percentage of each component printing color need not add up to 100%. For example, a single mixed color swatch can represent a color that includes 85% cyan and 75% Pantone® 569 M. In the event that 0% is selected as the initial value for a printing color and 0 is set as the repeat value, the printing color remains associated with the mixed color group, although it does not actually contribute to the appearance of any of the mixed color swatches. The repeat values for each color determine how many mixed color swatches are defined. If the combination of the repeat value, initial value and increment value cause any single printing color to exceed 100% for a particular mixed color swatch, the electronic document program can be programmed to select a default percentage of 100% for the printing color. Because the maximum percentage of any printing color is capped at 100% for the printing color. Because the maximum percentage of any printing color is capped at 100%, the final increment of a printing color in any mixed color swatch may not be equal to the percentage that is specified as part of the parameters to create the mixed ink group. The program may optionally warn the user when such as combination of values is selected. Any number of mixed color swatches can be created for each mixed color group; however, in typical applications, creating fewer than 1000 mixed color swatches cases management of the group for the user.

Once the printing color and parameter inputs have been received, the mixed color group is automatically created (step 115). To create the mixed color group, the electronic document program performs a combinatorial expansion based on the selected printing colors and the specified parameters according to a predetermined function. To create the first mixed color swatch in the mixed color group, the electronic document program combines each of the printing colors in amounts corresponding to the initial values specified for each printing color. Subsequent mixed color swatches are created by increasing the amount of each printing color by the corresponding increment value, repeating this process for each printing color for the number of times indicated by the corresponding repeat value. The program then repeats the process for the next printing color until all of the combinations of printing colors have been created. The mixed color swatches that result from the combinations can be represented on a computer screen or monitor. In one implementation, the color created by printing the inks according to the calculated percentages is approximated on the computer screen using the Newell color blending algorithm. Alternatively, the overprint preview (OPP) algorithm can be used.

A representation of the mixed color group is then displayed (step 120). The representation can be a preview 235 of some or all of the mixed color swatches in the mixed color group, which can be arranged, for example, according to one or more of the parameter values. The mixed color group can also be displayed in a color palette 300 as shown in FIG. 3, where individual mixed color swatches 305 can be nested within the mixed color group 315. The group of mixed color swatches can be represented in various ways. For example, the mixed color group can be displayed as a list, grid or a hierarchy of mixed color swatches. If the mixed color group is shown as a hierarchy, the hierarchy can be collapsed and expanded at the user's convenience. The method can assign a name to the mixed color group, and the name can be displayed in the representation. Displaying the group name along with the group allows the user to differentiate groups when multiple mixed color groups are created. Other identifiers associated with the group can include the respective components of each mixed color swatch, which can be displayed in association with the color. Unique names or numbers can also be assigned to each mixed color swatch and displayed.

Once the mixed color group has been displayed, or alternatively, after the mixed color group has been calculated, input specifying a modification to the mixed color group may be received (step 125). If an input modifying the mixed color group is received, the method makes the modification (step 130), which may include recalculating the mixed color group. The modified group can then be displayed, as described above. Examples of inputs for modifying the mixed color group are described further below.

The input can specify an additional printing color (and appropriate parameters for the new printing color). Alternatively, one or more of the printing colors can be deleted and the mixed color group recalculated to remove the deleted color(s), although deleting a spot color may convert the mixed colors to process colors if no other spot colors are included as printing colors.

The input can also specify a replacement color to replace one of the printing colors on which the mixed color group is based. The replacement color can be a process color or a spot color. If replacing one or more of the printing colors results in a mixed color group being derived from just a single printing color (e.g., if the mixed color group is generated from two printing colors and one of the two printing colors is replaced with the other printing color), all of the mixed color swatches are changed to tints of the single printing color. Optionally, if no new parameter values are concurrently received, the same repeat and increase values for the replaced printing color can be used for the replacement color. Thus, the replacement printing color merely takes the place of the replaced printing color in each of the mixed color swatches of the mixed color group. Alternatively, the electronic document program can be configured to prompt the user to input one or more parameter values for the replacement color. The replacement of a printing color propagates through the entire group to change the color represented by each mixed color swatch, where the change affects only mixed color swatches defined to include more than 0% of the replacement printing color.

A spot printing color can be converted to a process printing color—for example, using the Newell color blending method—to determine the combination of replacement process printing colors that most closely approximates the appearance of the replaced spot printing color. The replacements are then propagated through the mixed color group. If converting a spot printing color to a process color results in a group that is derived solely from process printing colors, all of the mixed color swatches are converted to combinations of process colors. Similarly, the input can specify adding a color swatch to the mixed color group. The additional color swatch 405 can represent any type of color, including spot colors, process colors, or mixed color swatches retrieved or created by the user (for example, colors defined in the mixed color group), as shown in FIG. 4. In one implementation, the additional color swatch is created by specifying two or more printing colors and a percentage of each printing color 410—for example, by manipulating sliders in a user interface dialog 400. The additional color swatch can also be retrieved from external sources, such as another document or a remote database (library) of color swatches. The additional color swatch can also represent a tint, which, as used in this specification, is a color that represents less than 100% of another mixed or printing color. Alternatively, the additional color can replace a mixed color swatch. In another implementation the mixed color group is limited to including mixed color swatches which represent combinations of only the printing colors used for the group. Thus, no spot colors, process colors or combinations of spot and process colors that are not printing colors of the group can be included in the mixed color group.

In addition, a mixed color swatch represented in the mixed color group can be edited. In one implementation, to edit a mixed color swatch the desired mixed color swatch can be selected and the among of at least one of the printing colors altered from its original value. Additionally, one or more of the mixed color swatches can be selected and the corresponding represented color converted to a process color—for example, by determining a combination of process colors that comes closest to achieving the color of the mixed color swatch. A mixed color swatch can also be copied so that the copy can be edited and added to the group as a new mixed color swatch, leaving the original mixed color swatch unchanged as a member of the group.

The mixed color group can be modified in other ways, such as by receiving new parameter values for one or more of the existing printing colors and modifying the mixed color group accordingly. Individual mixed color swatches (or groups of mixed color swatches) can also be deleted from the mixed color group.

The mixed color group is stored in a memory (step 135). The mixed color group can be stored in association with the name of the group, the parameter values, the printing colors, the mixed color swatches and/or any names associated with the mixed color swatches. The user can thereafter recall the mixed color group for use in an electronic document, or to modify the mixed color group for future use.

Once the mixed color group has been created, the printing colors, mixed color swatches or tints can be selected from a representation of the mixed color group, and used in a document. The mixed color swatches can be used in the electronic document program in the same way as swatches representing any process, spot or custom color. For example, the mixed color swatches can be used to define tints of color 505, as seen in FIG. 5. After a mixed color swatch is selected and applied to the document, the swatch and areas in the document where the swatch has been applied remain connected. If the parameters of the mixed color swatch are changed, such as the identify of the printing color or the value of one or more of the corresponding parameters, this change propagates through the document so that each instance of the mixed color swatch in the document is affected. For example, the values, such as a percent of the first color value, of the mixed color swatch can be changed, resulting in a change in the color represented by the mixed color swatch. At each location in the document that is associated with the mixed color swatch, this new color will be used in place of the color previously represented by the mixed color swatch.

The invention can be implemented in digital electronic circuitry, or in computer hardware, firmware, software, or in combination of them. The invention can be implemented, as shown in FIG. 6, as a computer program product, i.e., a computer program 605 tangibly embodied in an information carrier, e.g., in a machine readable storage device 610 or in a propagated signal, for execution by, or to control the operation of, data processing apparatus, e.g., a programmable processor 615, a computer 600, or multiple computers. A computer program can be written in any form of programming language, including compiled or interpreted languages, and it can be deployed in any form, including as a stand along program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of embodiments of the invention have been described. Nevertheless, it will be understood that various modifications may be made without departing from the spirit and scope of the invention. For example, the method steps of the invention can be performed in any order, and particular steps can be omitted in particular implementations. In one implementation, one printing color must be a spot color. The techniques described herein can be used to create one mixed color swatch instead of a group of mixed color swatches. Accordingly, other embodiments are within the scope of the following claims.

The invention claimed is:

1. A computer-implemented method, comprising:
   receiving data representing a first color representing a first ink and a second color representing a second ink and one or more color parameters for each of the first and second colors;
   defining a first mixed color group that aggregates a swatch collection of mixed color swatches each representing a mixture of an amount of the first color and an amount of the second color, the amounts of the first color and the second color for each of the mixed color swatches being defined according to a function of the color parameters of the first and second colors; and
   displaying the first mixed color group.

2. The method of claim 1, further comprising:
   displaying a representation of the first mixed color group.

3. The method of claim 2, wherein:
   displaying a representation of the first mixed color group includes displaying a representation of the first plurality of mixed color swatches as an arrangement of discrete colors.

4. The method of claim 1, wherein:
   the first ink is a spot ink.

5. The method of claim 4, wherein:
   the second ink is a spot ink or a process ink.

6. The method of claim 1, further comprising:
   associating a mixed color swatch of the plurality of first mixed color swatches with one or more locations in a document.

7. The method of claim 6, further comprising:
   receiving a change to a parameter of the mixed color swatch;
   modifying the mixed color swatch according to the received change; and
   associating the modified mixed color swatch with the one or more locations in the document.

8. The method of claim 1, wherein:
   receiving data representing the first and second colors and the one or more color parameters includes receiving user input.

9. The method of claim 8, wherein:
   receiving user input includes receiving user input in a graphical user interface.

10. The method of claim 1, wherein:
    receiving data representing the first and second colors and the one or more color parameters includes receiving data from a memory.

11. The method of claim 1, wherein:
    receiving data representing the first and second colors and the one or more color parameters includes receiving at least one of the first color, the second color, or one of the one or more color parameters separately.

12. The method of claim 1, further comprising:
    receiving data representing a third color representing a third ink; and
    defining a second mixed color group of swatches based on the first mixed color group and the third color.

13. The method of claim 12, wherein:
    the third color is represented by one of the mixed color swatches of the first mixed color group.

14. The method of claim 12, wherein:
defining a second mixed color group includes adding one or more mixed color swatches to the first mixed color group based at least in part on the third color.

15. The method of claim 12, wherein:
defining a second mixed color group includes redefining the first mixed color group by substituting the third color for one of the first color or the second color.

16. The method of claim 12, further comprising:
receiving data defining one or more color parameters for the third color;
wherein defining a second mixed color group includes defining a second mixed color group including a second plurality of mixed color swatches each representing a mixture of an amount of two or more of the first color, the second color and the third color, the amounts of each color for each of the mixed color swatches being defined according to a function of the color parameters of the corresponding color.

17. The method of claim 1, further comprising:
storing the first plurality of mixed color swatches in association with the first mixed color group.

18. The method of claim 1, further comprising:
receiving user input specifying a change to the first mixed color group; and
modifying the first mixed color group according to the specified change.

19. The method of claim 18, wherein:
the first color represents a spot ink;
receiving user input includes converting the first color to two or more colors, where the two or more colors represent process inks; and
modifying the first mixed color group includes determining the percentage of the two or more colors representing process inks required to produce the mixed color swatches of the first mixed color group.

20. The method of claim 18, wherein:
the user input identifies a mixed color swatch of the first plurality of mixed color swatches; and
modifying the first mixed color group includes deleting the identified mixed color swatch from the first mixed color group.

21. The method of claim 1, further comprising:
defining at least one tint for one of the mixed color swatches; and
modifying the first mixed color group to include a swatch representing the at least one tint.

22. The method of claim 21, further comprising:
displaying a representation of the modified first mixed color group.

23. The method of claim 1, further comprising:
receiving a change to a parameter of at least one mixed color swatch; and
modifying the mixed color swatch according to the received change.

24. A computer-implemented method comprising:
receiving data representing a first color representing a first ink and a second color representing a second ink and one or more color parameters for each of the first and second colors;
defining a first mixed color group including a first plurality of mixed color swatches each representing a mixture of an amount of the first color and an amount of the second color, the amounts of the first color and the second color for each of the mixed color swatches being defined according to a function of the color parameters of the first and second colors; and
displaying he first mixed color group; wherein:
the color parameters include an initial amount, an increment value, and a repeat value for each of the first color and the second color.

25. The method of claim 24, wherein:
defining a first mixed color group includes calculating the amount of each of the first color and the second color for each of the plurality of mixed color swatches based on the initial amounts, the increment values and the repeat values.

26. A computer readable medium storing a computer program for creating mixed color groups, the computer program comprising instructions to cause a computer system to:
receive data representing a first color representing a first ink and a second color representing a second ink and one or more color parameters for each of the first and second colors; and
define a first mixed color group that aggregates a swatch collection of mixed color swatches each representing a mixture of an amount of the first color and an amount of the second color, the amounts of the first color and the second color for each of the mixed color swatches being defined according to a function of the color parameters of the first and second colors.

27. The computer readable medium of claim 26, further comprising instructions operable to cause the computer program to:
display a representation of the first mixed color group.

28. The computer readable medium of claim 27, wherein:
the instructions operable to cause the computer program to display a representation of the first mixed color group includes instructions operable to cause the computer program to display a representation of the first plurality of mixed color swatches as an arrangement of discrete colors.

29. The computer readable medium of claim 26, wherein:
the first ink is a spot ink.

30. The computer readable medium of claim 29, wherein:
the second ink is a spot ink or a process ink.

31. The computer readable medium of claim 26, further comprising instructions operable to cause the computer program to:
associate a mixed color swatch of the plurality of first mixed color swatches with one or more locations in a document.

32. The computer readable medium of claim 31, further comprising instructions operable to cause the computer program to:
receive a change to a parameter of the mixed color swatch;
modify the mixed color swatch according to the received change; and
associate the modified mixed color swatch with the one or more locations in the document.

33. The computer readable medium of claim 26, wherein:
the instructions operable to cause the computer program to receive data representing the first and second colors and the one or more color parameters includes instructions operable to cause the computer program to receive user input.

34. The computer readable medium of claim 33, wherein:
the instructions operable to cause the computer program to receive user input includes include instructions operable to cause the computer program to receive user input in a graphical user interface.

35. The computer readable medium of claim 26, wherein:
the instructions operable to cause the computer program to receive data representing the first and second colors and the one or more color parameters includes instructions operable to cause the computer program to receive data from a memory.

36. The computer readable medium of claim 35, wherein: the instructions operable to cause the computer program to receive data representing the first and second colors and the one or more color parameters includes instructions operable to cause the computer program to receive at least one of the first color, the second color, or one of the one or more color parameters separately.

37. The computer readable medium of claim 26, further comprising instructions operable to cause the computer program to:
receive data representing a third color representing a third ink; and
define a second mixed color group of swatches based on the first mixed color group and the third color.

38. The computer readable medium of claim 37, wherein: the third color is represented by one of the mixed color swatches of the first mixed color group.

39. The computer readable medium of claim 37, wherein: the instructions operable to cause the computer program to define a second mixed color group include instructions operable to add one or more color swatches to the first mixed color group based at least in part on the third color.

40. The computer readable medium of claim 37, wherein: the instructions operable to cause the computer program to define a second mixed color group include instructions operable to redefine the first mixed color group by substituting the third color for one of the first color or the second color.

41. The computer readable medium of claim 37, further comprising:
instructions operable to cause the computer program to receive data defining one or more color parameters for the third color;
wherein the instructions operable to cause the computer program to receive a second mixed color group include instructions operable to cause the computer program to define a second mixed color group including a second plurality of mixed color swatches each representing a mixture of an amount of two or more of the first color, the second color and the third color, the amounts of each color for each of the mixed color swatches being defined according to a function of the color parameters of the corresponding color.

42. The computer readable medium of claim 26, further comprising:
instructions operable to cause the computer program to store the first plurality of mixed color swatches in association with the first mixed color group.

43. The computer readable medium of claim 26, further comprising instructions operable to cause the computer program to:
receive user input specifying a change to the first mixed color group; and
modify the first mixed color group according to the specified change.

44. The computer readable medium of claim 43, wherein: the first color represents a spot ink;
the instructions to receive user input include instructions to convert the first color to two or more colors, where the two or more colors represent process inks; and
the instructions to modify the first mixed color group include instructions to determine the percentage of the two or more colors representing process inks required to produce the mixed color swatches of the first mixed color group.

45. The computer readable medium of claim 43, wherein: the user input identifies a mixed color swatch of the first plurality of mixed color swatches; and
the instructions operable to cause the computer program to modify the first mixed color group include deleting the identified mixed color swatch from the first mixed color group.

46. The computer readable medium of claim 26, further comprising instructions operable to cause the computer program to:
define at least one tint for one of the mixed color swatches; and
modify the first mixed color group to include a swatch representing the at least one tint.

47. The computer readable medium of claim 46, further comprising instructions operable to cause the computer program to:
display a representation of the modified first mixed color group.

48. The computer readable medium of claim 26, further comprising instructions operable to cause the computer program to:
receive a change to a parameter of at least one mixed color swatch; and
modify the mixed color swatch according to the received change.

49. A computer readable medium storing a computer program for creating mixed color groups, the computer program comprising instructions to cause a computer system to:
receive data representing a first color representing a first ink and a second color representing a second ink and one or more color parameters for each of the first and second colors; and
define a first mixed color group including a first plurality of mixed color swatches each representing a mixture of an amount of the first color and an amount of the second color, the amounts of the first color and the second color for each of the mixed color swatches being defined according to a function of the color parameters of the first and second colors; wherein:
the color parameters include an initial amount, an increment value, and a repeat value for each of the first color and the second color.

50. The computer readable medium of claim 49, wherein: the instructions operable to cause the computer program to define a first mixed color group includes instructions operable to cause the computer program to calculate the amount of each of the first color and the second color for each of the plurality of mixed color swatches based on the initial amounts, the increment values and the repeat values.

51. A system comprising:
a processor; and
a computer readable medium storing a computer program for creating mixed color groups, the computer program comprising instructions to cause the processor to perform operations comprising:
receiving data representing a first color representing a first ink and a second color representing a second ink and one or more color parameters for each of the first and second colors; and
defining a first mixed color group that aggregates a swatch collection of mixed color swatches each representing a mixture of an amount of the first color and an amount of the second color, the amounts of the first color and the second color for each of the mixed color swatches being defined according to a function of the color parameters of the first and second colors.

52. The system of claim 51, the operations further comprising:
displaying a representation of the first mixed color group.

53. The system of claim 52, wherein:
displaying a representation of the first mixed color group includes displaying a representation of the first plurality of mixed color swatches as an arrangement of discrete colors.

54. The system of claim 51, wherein:
the first ink is a spot ink.

55. The system of claim 54, wherein:
the second ink is a spot ink or a process ink.

56. The system of claim 51, the operations further comprising:
associating a mixed color swatch of the plurality of first mixed color swatches with one or more locations in a document.

57. The system of claim 56, the operations further comprising:
receiving a change to a parameter of the mixed color swatch;
modifying the mixed color swatch according to the received change; and
associating the modified mixed color swatch with the one or more locations in the document.

58. The system of claim 51, wherein:
receiving data representing the first and second colors and the one or more color parameters includes receiving user input.

59. The system of claim 58, wherein:
receiving user input includes receiving user input in a graphical user interface.

60. The system of claim 51, wherein:
receiving data representing the first and second colors and the one or more color parameters includes receiving data from a memory.

61. The system of claim 51, wherein:
receiving data representing the first and second colors and the one or more color parameters includes receiving at least one of the first color, the second color, or one of the one or more color parameters separately.

62. The system of claim 51, the operations further comprising:
receiving data representing a third color representing a third ink; and
defining a second mixed color group of swatches based on the first mixed color group and the third color.

63. The system of claim 62, wherein:
the third color is represented by one of the mixed color swatches of the first mixed color group.

64. The system of claim 62, wherein:
defining a second mixed color group includes adding one or more mixed color swatches to the first mixed color group based at least in part on the third color.

65. The system of claim 62, wherein:
defining a second mixed color group includes redefining the first mixed color group by substituting the third color for one of the first color or the second color.

66. The system of claim 62, the operations further comprising:
receiving data defining one or more color parameters for the third color;
wherein defining a second mixed color group includes defining a second mixed color group including a second plurality of mixed color swatches each representing a mixture of an amount of two or more of the first color, the second color and the third color, the amounts of each color for each of the mixed color swatches being defined according to a function of the color parameters of the corresponding color.

67. The system of claim 51, the operations further comprising:
storing the first plurality of mixed color swatches in association with the first mixed color group.

68. The system of claim 51, the operations further comprising:
receiving user input specifying a change to the first mixed color group; and
modifying the first mixed color group according to the specified change.

69. The system of claim 68, wherein:
the first color represents a spot ink;
receiving user input includes converting the first color to two or more colors, where the two or more colors represent process inks; and
modifying the first mixed color group includes determining the percentage of the two or more colors representing process inks required to produce the mixed color swatches of the first mixed color group.

70. The system of claim 68, wherein:
the user input identifies a mixed color swatch of the first plurality of mixed color swatches; and
modifying the first mixed color group includes deleting the identified mixed color swatch from the first mixed color group.

71. The system of claim 51, the operations further comprising:
defining at least one tint for one of the mixed color swatches; and
modifying the first mixed color group to include a swatch representing the at least one tint.

72. The system of claim 71, the operations further comprising:
displaying a representation of the modified first mixed color group.

73. The system of claim 51, the operations further comprising:
receiving a change to a parameter of at least one mixed color swatch; and
modifying the mixed color swatch according to the received change.

74. A system comprising:
a processor; and
a computer readable medium storing a computer program for creating mixed color groups, the computer program comprising instructions to cause the processor to perform operations comprising:
receiving data representing a first color representing a first ink and a second color representing a second ink and one or more color parameters for each of the first and second colors; and
defining a first mixed color group including a first plurality of mixed color swatches each representing a mixture of an amount of the first color and an amount of the second color, the amounts of the first color and the second color for each of the mixed color swatches being defined according to a function of the color parameters of the first and second colors; wherein:

the color parameters include an initial amount, an increment value, and a repeat value for each of the first color and the second color.

75. The system of claim 74, wherein:

defining a first mixed color group includes calculating the amount of each of the first color and the second color for each of the plurality of mixed color swatches based on the initial amounts, the increment values and the repeat values.

* * * * *

UNITED STATES PATENT AND TRADEMARK OFFICE
CERTIFICATE OF CORRECTION

PATENT NO. : 7,408,673 B1 Page 1 of 1
APPLICATION NO. : 10/646993
DATED : August 5, 2008
INVENTOR(S) : Kathryn Chinn, William Eisley and Susan Cheng-Looi It is certified that error appears in the above-identified patent and that said Letters Patent is hereby corrected as shown below:

On the Title Page - item (56); OTHER PUBLICATIONS:
    right column, line 7:
        delete "Quak", and replace with --Quark--

Claim 24:
    column 10, line 1:
        delete "he", and replace with --the--

Claim 34:
    column 10, line 62:
        delete "include"

Signed and Sealed this

Twenty-fourth Day of February, 2009

JOHN DOLL
*Acting Director of the United States Patent and Trademark Office*